March 1, 1938.  G. W. WATTS  2,109,915
TUBULAR CONNECTION
Filed Feb. 27, 1936

Inventor:—
George W. Watts

BY Edward B. Beale
ATTORNEY

Patented Mar. 1, 1938

2,109,915

UNITED STATES PATENT OFFICE 2,109,915

TUBULAR CONNECTION

George W. Watts, Flossmoor, Ill., assignor to Standard Oil Company, Chicago, Ill., a corporation of Indiana Application February 27, 1936, Serial No. 66,082

7 Claims. (Cl. 29—157)

This invention relates to improvements in fabricating pressure vessels, and in particular, to improvements in attaching tubular connections such as nozzles, manways and the like to pressure vessels.

Tubular connections, nozzles, manways and the like are generally attached to pressure vessels by cutting a hole in the wall of the vessel and welding the tubular connection to the wall of the vessel by welding on both the exterior and interior surfaces of the vessel wall. When added strength is desired a reinforcing ring is placed around the tubular connection and welded at its outer periphery to the wall of the vessel and at its inner periphery to the neck of the tubular connection and/or to the wall of the vessel. This method of attaching tubular connections to pressure vessels has the serious drawback in that the welds around the welded neck cannot be X-rayed or radiographed. Since the detection of flaws in welds in vessels, and particularly pressure vessels, is of greatest importance the desirability of being able to X-ray all welds in pressure vessels becomes readily apparent.

Furthermore, reinforcing rings add a great amount of "dead metal" to the shell since it is the common practice to make the rings at least twice the diameter of the opening in the shell. Also, the broad stiff reinforcing rings attached to the shell at or near their outer periphery are subjected to undesirable bending effects.

It is an object of the present invention to provide a method of attaching tubular connections such as nozzles, manways and the like to pressure vessels by welding which permits the X-raying or radiographing of such welds.

It is another object of this invention to provide a method of attaching reinforced nozzles, manways and the like to pressure vessels which requires but a single weld.

A further object of this invention is to provide a method of attaching reinforced tubular connections to pressure vessels which permits the concentration of metal close to the edge of the hole thereby distributing the stresses more uniformly therethrough and eliminating undesirable bending effects.

Other objects of this invention will become apparent from the following description read in conjunction with the attached drawing which forms a part of the specification, and in which.

This invention is particularly adapted for welding tubular connections such as nozzles, manways and the like to pressure vessels such as soaking drums, reaction vessels, cracking stills, and other similar equipment. Instead of welding the tubular connection to the vessel and reinforcing the same with the usual built-up type of reinforcement, the present invention contemplates forging the tubular connection with the reinforcement forged integral with the neck, bluntly reducing the thickness of the reinforcement to form an integral welding flange having the same thickness as the vessel wall, and butt welding at a distance from the neck sufficient to permit X-raying or radiographing the welded butt joint.

Figure 1:
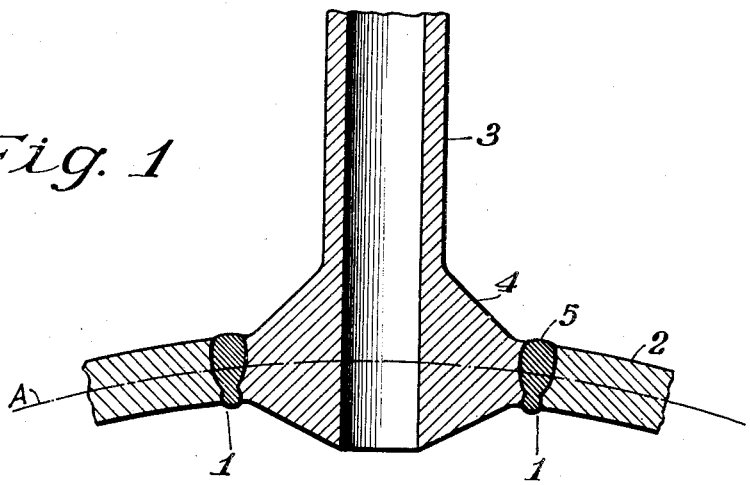
Fig. 1 is a longitudinal section through a tubular connection and a section of a vessel showing the tubular connection attached to the wall of the vessel in accordance with the preferred embodiment of the present invention.

The method of attaching tubular connections to pressure vessels is illustrated in Figure 1. Referring to Figure 1, a suitable opening 1 is cut and/or chipped in the vessel wall 2 to receive the forged tubular connection 3. The tubular connection 3 is forged with an integral reinforcement 4 disposed about its lower end. The integral reinforcement 4 is bluntly tapered to the thickness of the vessel wall 2 and butt welded thereto as shown at 5 by well known welding methods with the integral reinforcement 4 substantially equally disposed by radial measurement about the middle surface A of the vessel wall 2.

When the tubular connection is provided with a flanged head it is necessary to locate the weld so that the flange head will not interfere with the X-raying or radiographing of the weld. I do this by extending the reduced integral reinforcement to form an integral welding flange. This is shown by Figure 2.

Figure 2:
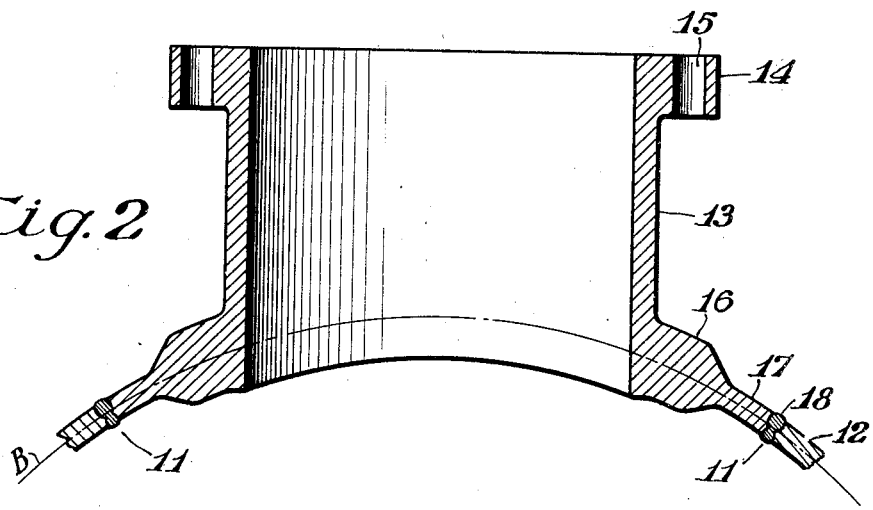
Fig. 2 is a longitudinal section through a flanged tubular connection and a section of a vessel showing the flanged tubular connection attached to the wall of the vessel in accordance with the preferred embodiment of the present invention.

Referring to Figure 2 a suitable opening 11 is cut and/or chipped in the vessel wall 12 to receive the forged tubular connection 13 which is provided with a flanged head 14 having a plurality of bolt holes 15. The forged tubular connection 13 is provided with a forged integral reinforcement 16 at its lower portion. The forged integral reinforcement is tapered to the thickness of vessel wall 12 and the reduced portion extended to form an integral welding flange 17 which is butt welded to the vessel wall 12 as shown at 18 by well known welding methods with the integral reinforcement 16 substantially equally disposed by radial measurement about the middle surface B of the vessel wall 12.

The butt joint for welding should be located sufficiently far away from the reinforcement and flanged head in an area of uniform cross section to facilitate X-raying or radiographing. Where the tubular connection is not provided with a flanged head the butt weld may be located close to the integral reinforcement. However, where the tubular connection is equipped with a flanged head 14 as shown in Figure 2 the integral welding flange 17 should be extended beyond the flanged head before butt welding in order to facilitate X-raying or radiographing. For most purposes the butt weld should clear the flange head by one-half to three inches.

I prefer to reduce the external diameter of the integral reinforcement to a minimum commensurable with the uniform distribution of stresses and the elimination of undesirable bending effects. Because of the wide variances in the conditions to which pressure vessels are subjected it is not feasible to specify dimensions for the tubular connections and the integral reinforcement. However, I have found that for small openings in heavy walled vessels, for example, when the ratio of the thickness of the vessel wall to the diameter of the opening in the vessel wall is of the order of 5 to 1 or 6 to 1, the best reinforcement is attained with the following relations:

$$\frac{\text{External radius of the reinforcement}}{\text{Internal radius of the reinforcement}} = 5 \text{ to } 6 \text{ (maximum)}$$

and $$\frac{\text{Greatest thickness of the reinforcement}}{\text{Thickness of the vessel wall}} = 1.5 \text{ (minimum)}$$

For large openings in thin walled vessels, for example, when the ratio of the thickness of the vessel wall to the diameter of the opening in the vessel wall is of the order of 1 to 50, the best reinforcement is attained with the following relations:

$$\frac{\text{External radius of the reinforcement}}{\text{Internal radius of the reinforcement}} = 1.3 \text{ (minimum)}$$

and $$\frac{\text{Greatest thickness of the reinforcement}}{\text{Thickness of the vessel wall}} = 3 \text{ to } 4 \text{ (maximum)}$$

The method of attaching tubular connections to pressure vessels as described in the foregoing permits unobstructed X-ray examination of the weld. Since with my integral reinforcement but a single weld is required, less welding is required than in the built-up reinforced pad type construction.

The term "vessel wall" as used herein and in the following claims includes the vessel head.

While I have described in detail preferred embodiments of my invention I do not limit myself to the specific applications, dimensions and ratios, except as defined by the following claims which shall be construed as broadly as the prior art will permit.

I claim:

1. The method of attaching a forged tubular connection to vessels which comprises forming an opening in the vessel wall, disposing the forged tubular connection in said opening, said tubular forged connection having a forged integral reinforcement disposed about the lower portion thereof, said forged integral reinforcement being tapered at its periphery to the vessel wall thickness and butt welding said forged tubular connection at the periphery of said integral reinforcement to the vessel wall.

2. The method of attaching a tubular connection to vessels which comprises forming an opening in the vessel wall, disposing the tubular connection in said opening, said tubular connection having an integral reinforcement disposed about its lower portion, said integral reinforcement being tapered to the thickness of the vessel wall, and butt welding said integral reinforced tubular connection to the vessel at a point where the cross section of the reduced integral reinforcement is substantially equal to the cross section of the vessel wall.

3. The method of attaching a tubular connection to vessels which comprises forming an opening in the vessel wall, disposing the tubular connection in said opening, said tubular connection having an integral reinforcement disposed about its lower portion, said integral reinforcement being tapered at its periphery and extended to form an integral welding flange, said integral welding flange having substantially the same thickness as the vessel wall, and butt welding the integral welding flange to the vessel wall.

4. The method of attaching a tubular connection to vessels which comprises forming an opening in the vessel wall, disposing the tubular connection in said opening, said tubular connection having an integral reinforcement disposed about its lower portion, said integral reinforcement being tapered to an integral welding flange, said integral welding flange having substantially the same thickness as the vessel wall, and butt welding the integral welding flange to the vessel wall.

5. The method of attaching a forged tubular connection to vessels which comprises forming an opening in the vessel wall, disposing the forged tubular connection in said opening, said forged tubular connection having a forged integral reinforcement disposed about its lower portion, said forged integral reinforcement being substantially equally disposed by radial measurement about the middle surface of the vessel wall and being tapered at its periphery to an integral welding flange, said integral welding flange having substantially the same thickness as the vessel wall, and butt welding the integral welding flange to the vessel wall.

6. The method of attaching a forged flanged head tubular connection to a vessel which comprises forming an opening in the vessel wall, disposing said forged flanged head tubular connection in said opening, said forged flanged head tubular connection having a forged integral reinforcement disposed about its lower portion, said forged integral reinforcement being substantially equally disposed by radial measurement about the middle surface of the vessel wall and being tapered at its periphery to an integral welding flange, said integral welding flange having substantially the same thickness as the vessel wall and a diameter substantially larger than the diameter of the flanged head, and butt welding the integral welding flange to the vessel wall to permit X-ray examination of the weld.

7. The method of attaching a forged tubular connection to a vessel which comprises forging a tubular connection with an integral reinforcement about its lower portion, tapering the integral reinforcement at its periphery to an integral welding flange having substantially the same thickness as the vessel wall, said integral reinforcement being substantially symmetrical about the middle surface of the welding flange, forming an opening in the vessel wall, disposing the forged integral reinforced tubular connection in the opening and butt welding the integral welding flange to the vessel wall at a point sufficiently distanced from the tubular connection to permit X-ray examination of the weld.

GEORGE W. WATTS.